Jan. 12, 1971 P. H. SHARPE 3,553,943
SMOKE AND GAS CLEANING APPARATUS
Filed Nov. 6, 1968 2 Sheets-Sheet 2

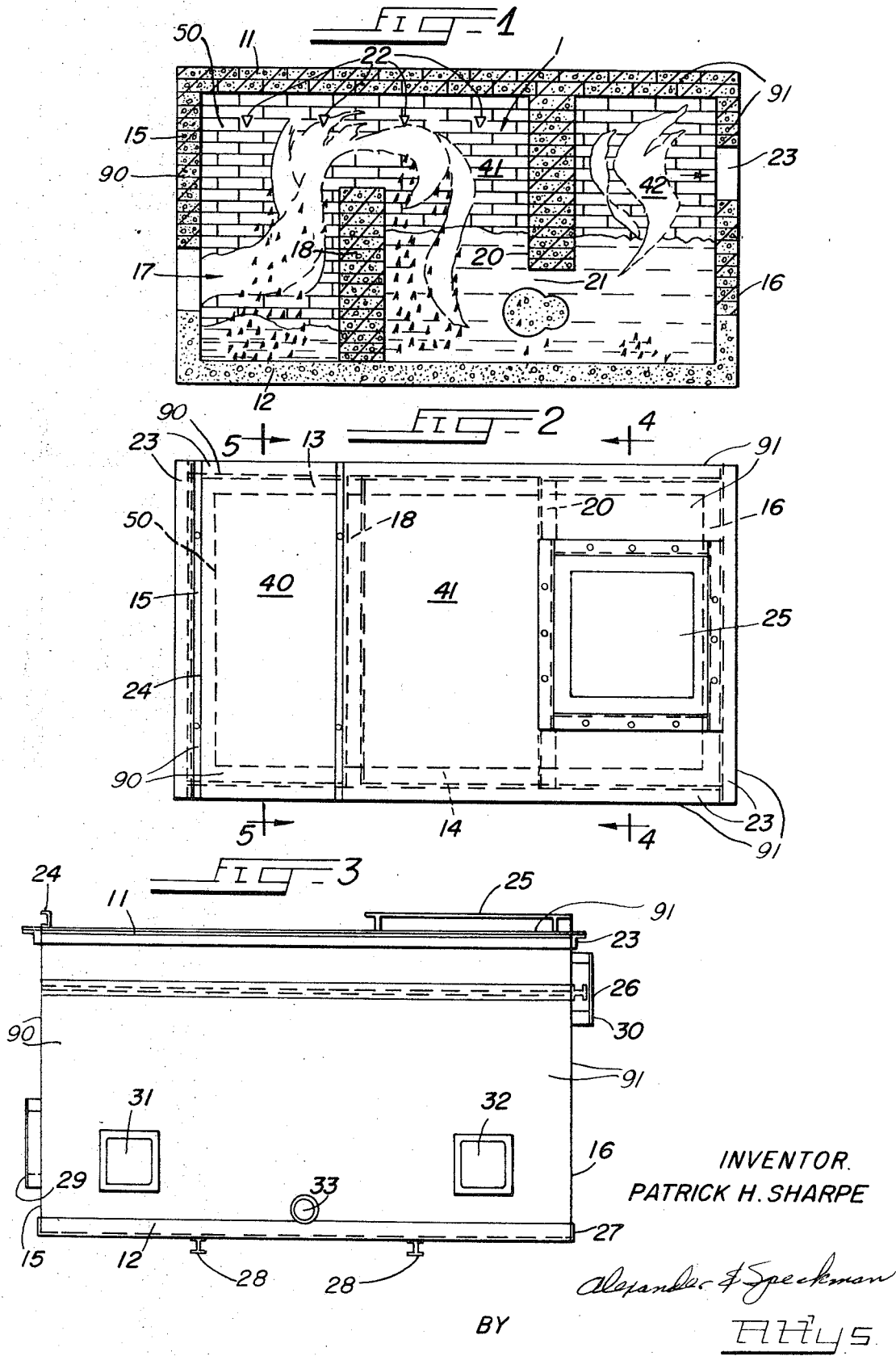

INVENTOR.
PATRICK H. SHARPE

BY *Alexander F. Speckman*
ATTYS

United States Patent Office 3,553,943
Patented Jan. 12, 1971

3,553,943
SMOKE AND GAS CLEANING APPARATUS
Patrick H. Sharpe, Flossmoor, Ill., assignor to Brulé
C.E. & E., Inc., Blue Island, Ill., a corporation of
Illinois
Filed Nov. 6, 1968, Ser. No. 773,754
Int. Cl. B01d 47/02
U.S. Cl. 55—223                                7 Claims

ABSTRACT OF THE DISCLOSURE

Apparatus including a chamber having partitions forming compartments some of which are provided with spray nozzles and a liquid bath whereby smoke is sprayed with water and passed through the liquid bath.

The problem of air pollution has received increasing attention, especially in large cities or congested aeras. One of the major sources of air pollution arises from combustion, especially in incineration of waste materials and in combustion associated with various industrial and chemical processes. Many governmental organizations are resorting to ever-tightening ordinances controlling introduction of smoke and noxious gases into the atmosphere.

One of the objects of this invention is to provide an apparatus for handling smoke and gases from combustion and noxious gases produced by the chemical industry so that when the effluent is introduced into the atmosphere, it would be sufficiently cleaned of particulate matter and noxious gases to be unobjectionable.

Another object of this invention is to provide an apparatus to more effectively remove the major portion of particulate matter and objectionable odors from incinerator effluent.

Still another object of this invention is to remove a major portion of the carbonaceous material from the effluent of combustion chambers.

Another object of this invention is to provide an apparatus to pass effluent of combustion, or noxious gases, through a treating apparatus so that the gases pass over a pressurized water bath, countercurrent through water spray, and finally through water before passing to the atmosphere.

Another object of this invention is to provide an apparatus to pass combustion effluent and noxious gases at different velocities through water sprays and a water trap with multiple changes of direction.

Another object of this invention is to provide an apparatus having an arched top in the spray portion of the apparatus so as to create turbulence of gases passing therethrough.

Still another object of this invention is to provide an apparatus which may be lined with refractory materials to permit high temperature operation and provide resistance to chemical attack.

These and other important objects of the inventon will become apparent from the following description taken in conjunction with the drawings illustrating preferred embodiments wherein:

FIG. 1 is a schematic cross-sectional view of an apparatus embodying the principles of this invention.

FIG. 2 is a top view of one preferred apparatus of this invention.

FIG. 3 is a front elevation of the apparatus shown in FIG. 2.

Figure 4:
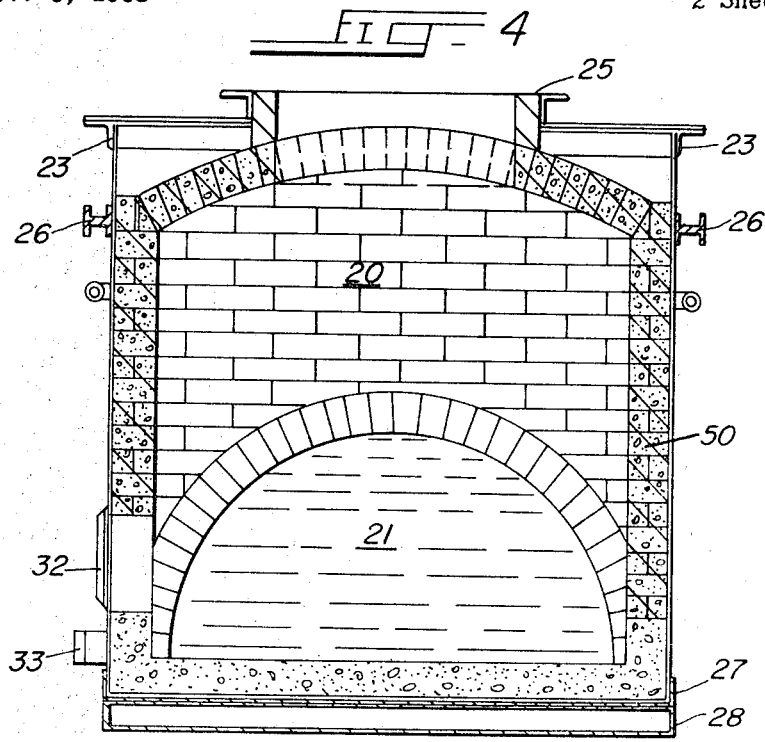
FIG. 4 is a sectional view of the apparatus through 4—4 shown in FIG. 2.

The general aspects of the apparatus of this invention are best understood by reference to FIG. 1, showing generally chamber 1 defined by top 11, bottom 12, opposite side walls 13 and 14, first end 15 and opposite end 16. Chamber 1 is divided into three treatment sections. The first section is between end 15 and partition 18 and is shown as 40. The section generally defined between partition 18 and 20 is shown as section 41, and the section between partition 20 and end 16 is shown as section 42. Each of the sections are in communication with the adjacent section or sections.

Section 40 is separated from section 41 by first partition 18 spaced toward end 16 from end 15, extending upwardly from bottom 12 and extending to each side wall 13 and 14. First partition 18 does not extend to top 11 leaving an opening 19 for passage of gases from section 40 to section 41. Opening 19 may be adjusted in size to obtain desired velocity of gas flow from section 40 to section 41, but must be of sufficient height to maintain liquid level between partition 18 and the end 16 higher than the top of opening 21. The shape of opening 19 may be varied to obtain desired velocity of gas flow, but it is preferable that the top of opening 19 be defined by top 11. It is preferable that partition 18 have openings or regulating means at its base to permit flow of liquid between sections 40 and 41 so that all of the liquid may be controlled through a single drain. It is apparent that the liquid may be removed from several drains, such as one in each section.

Section 41 is separated from section 42 by second partition 20 spaced between first partition 18 and end 16 extending downwardly from top 11 and extending to each side wall 13 and 14. Partition 18 does not extend to bottom 12 leaving opening 21. Partition 20 extends downwardly for a distance to provide opening 21 which is completely below the surface of the liquid contained between partition 18 and end 16 and of appropriate size to obtain desired rate of passage of gases through the liquid from section 41 to 42. Opening 21 may be of any desired shape to regulate flow of gases and liquids therethrough. A preferred shape for opening 21 is an arched opening in partition 20 with the opening extending to bottom 12.

First end 15 and side walls 13 and 14 between first end 15 and first partition 18 form an inlet area 90. Inlet 17 is defined by inlet area 90 such that inlet 17 is sufficiently high to permit retention of liquid between said first end and said first partition but the inlet is at a level below the level of upward extension of first partition 18 from bottom 12.

Opposite end 16, side walls 13 and 14 between second partition 20 and opposite end 16, and top 11 between second partition 20 and opposite end 16 form an outlet area 91. Outlet 23 is defined by outlet area 91 such that outlet 23 is at a level above the level of downward extension of second partition 20 from top 11.

First partition 18 extends upwardly from the bottom 12 to a level higher than the level of downward extension of second partition 20 from top 11, thus allowing retention of fluid between said first partition and opposite end 16 at a level above said opening of the second partition.

First end 15, as shown in FIG. 1, is provided with inlet opening 17 having conduit relation between section 40 of the chamber of the cleaning apparatus and the gaseous effluent from burning chambers, incinerators, treating chambers and the like. Thus, it is seen that opening 17 provides for the inflow of gases from associated apparatus. Inlet 17 is located sufficiently high above base 12 to permit retention of liquid between end 15 and partition 18 and of sufficient depth to permit collection of particles and sufficient flow of the liquid. Some particulate matter may be removed with the liquid flow and the remainder of the particulate matter will settle to the bottom of the chamber. While inlet opening 17 is shown in the FIG. 1 as being in the end of the apparatus, it is apparent that the opening can be placed in the lower portion of either side between end 15 and partition 18.

End 16 is provided with outlet opening 23 in its upper portion for conduction of the relatively clean gases to the atmosphere. Although outlet opening 23 is shown in end 16, it is readily apparent that the outlet opening may be in the upper portion of either of the side walls in chamber 42 or through the top of chamber 42. Outlet 23 must be sufficiently high to be entirely above the surface of fluid in chamber 42. Outlet 23 is in communication with the atmosphere, preferably through an external blower providing forced draft for suitable movement of smoke and gases through the cleaning apparatus of this invention as well as providing suitable draft for the combustion chamber in communication with inlet 17. It is apparent that a blower may be located between inlet 17 and the associated apparatus.

Spray nozzles 22 are located near the upper portion of sections 40 and 41 and are directed downwardly. The spray nozzles are attached to an external pumping-purification and make-up system so that liquid containing particulate matter and dissolved noxious gases is removed from chamber 1 through a drain near the bottom, passed through a treating means to remove the particulate matter and noxious gases, and pumped under pressure back through nozzles 22, sufficient make-up liquid being added to compensate for evaporation and other losses. It is apparent that the spray liquid may be all fresh liquid and the drain effluent discharged from the system. The desired rate of flow of liquid from the nozzles is determined by the type of contamination to be removed, the temperature of the smoke or gases and the physical geometry of the cleaning apparatus. For cleaning smoke, water is a preferred liquid. Various chemical solvents may be used as the liquid of this cleaning apparatus to obtain solubility of contaminants.

Clean out openings should provide access to the lower portions of chamber 1 to remove particulate matter which does not drain with the fluid.

As shown in FIG. 1, smoke or gas containing particulate matter and/or noxious gases enters the cleaning apparatus in the lower portion of section 40 and travels upwardly at a relatively slow velocity against spray from spray nozzles removing larger particulate matter to the liquid at the bottom of section 40. The gas passes from section 40 to section 41 through opening 19 at relatively higher velocity due to the size relationships between opening 19 and cross section of section 40. The gas moves downwardly in section 41 in the same direction as the spray from the nozzles and at high velocity into the fluid in section 41. The greater portion of the remaining particulate matter is removed in the liquid by change of direction and relatively high velocity in passing through opening 21 into section 42. The gas rises through the water at a relatively slower rate permitting solution of noxious gases in the liquid and the treated gas stream is then removed from the apparatus through outlet opening 23.

Thus, it is seen the process of the invention is characterized by first upward flow of gas through downward spray, then downward flow of gas with the downward spray impacting into water at relatively high velocity and passing through water at differing velocities with at least one change of direction and then flowing from the apparatus.

The cleaning apparatus of this invention may be used to remove particulate matter and noxious gases from any gas flow such as the effluent from combustion chambers containing the products of combustion, as well as the effluent of various chemical or mechanical processes containing contaminates which are undesirable for release to the atmosphere.

Referring to FIGS. 2, 3, 4 and 5, details of a preferred apparatus of this invention are shown wherein the inner walls are completely lined with refractory materials, the partitions separating the three compartments of the apparatus are constructed of refractory materials, and the entire apparatus is encased in a structural steel casing permitting handling and shipping of the fully assembled apparatus and easy attachment of the cleaning apparatus to an incinerator. The lining of the chamber is indicated by numeral 50. The field attachment of the cleaning apparatus to an incinerator is achieved with minimal requirement for skilled assembly workers. The complete assembly of the cleaning apparatus at a central production facility allows efficient use of skilled workers in the construction of the cleaning apparatus. The cleaning apparatus shown in the FIGS. 2 through 5 is designed to function most satisfactorily having the effluent of an incinerator as its input and a suction fan device connected to the output of the chamber of the cleaning apparatus to provide for the flow of smoke through the apparatus and to the atmosphere. The apparatus shown was designed to operate effectively using water sprays and water baths which are cleaned through a recirculating system, thereby minimizing the water requirements of the apparatus.

Referring to FIG. 2, a top view of the apparatus is shown having exterior steel casing and structural steel framework to act as stiffening and reinforcing, thereby permitting easy shipment of the assembled apparatus. FIG. 2 shows angle iron sections 23 extending around the top corner of the apparatus. Angle iron section 24 is provided as a stiffener at the top of wall 15. Access cover 25 is provided to permit thorough cleaning of the apparatus while in the installed position.

FIG. 3 is a side elevation of the apparatus of FIG. 2 showing additionally reinforcing beams 26 around the steel casing of the apparatus, bottom angle iron shapes 27 around the base of the apparatus, and beams 28 for mounting the apparatus and serving as skids for movement. FIG. 3 shows sleeve 29 around inlet 17 for connection with the associated incinerator apparatus. Also shown is sleeve 30 around outlet 23 for ready mounting to an exterior blower system. Access door 31 provides for clean-out of large particulate matter from the bottom of chamber 40 and access door 32 provides for clean-out from the common bottom of chambers 41 and 42. Drain 33 provides for removing water from the bottom of sections 40, 41 and 42 for treatment including removal of particulate matter, aerating when desirable, addition of required make-up water, and return of the water under pressure to the spray nozzles at the top of the apparatus.

FIG. 4 is a cross section through the apparatus shown in FIGS. 2 and 3 at the position and direction shown by line 4—4 in FIG. 2. FIG. 4 shows partition 20 with arched opening 21. The inner lining of the apparatus shown in FIGS. 2 through 5 has an arched reframtory top as shown in FIG. 4. The arched top aids in creating desired turbulance of gases passing through the apparatus and reduces dead volumes within the chamber. The apparatus is made up of a cast concrete-refractory base with all of the inner lining and partition materials being of refractory brick.

Figure 5:
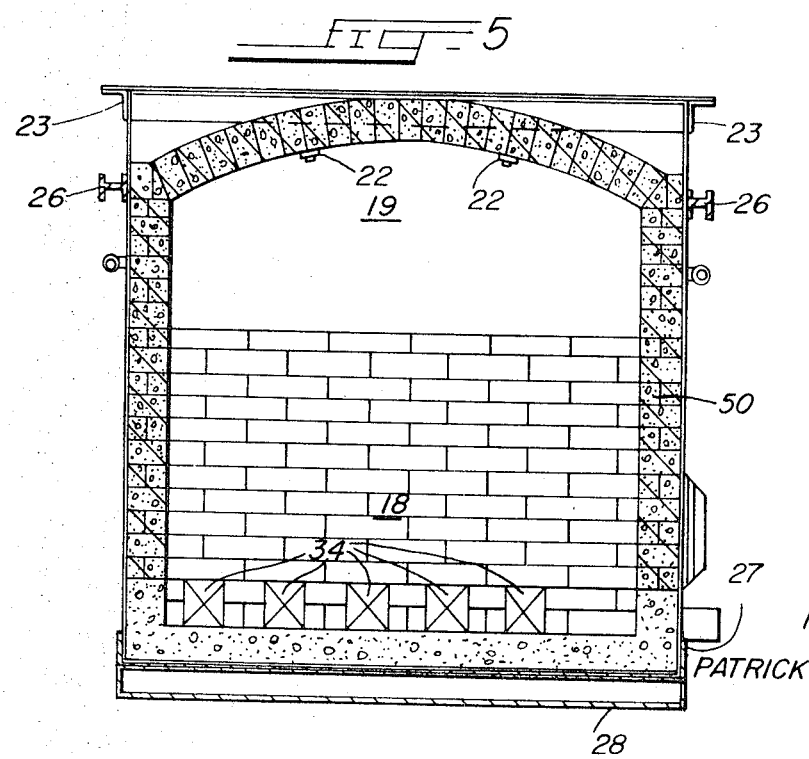
FIG. 5 is a sectional view of the apparatus through 5—5 shown in FIG. 2.

FIG. 5 is a cross section through the apparatus shown in FIG. 2 at the position and direction shown by line 5—5. FIG. 5 shows first partition 18, opening 19, and spray nozzles 22 located in the top of chamber 40. However, the spray nozzles may be located at various locations in the upper portions of the side walls or in the top of chambers 40 and 41. FIG. 5 also shows openings 34 in the bottom of partition 18 for circulation of the water from chamber 40 to chambers 41 and 42. These openings may be provided with means for controlling rate of flow to maintain desired different water levels on each side of partition 18.

While the figures show a preferred embodiment of this invention having the entire inner surfaces of the apparatus lined with refractory materials for high temperature use, the same apparatus may be readily constructed for low temperature use by appropriate metal or plastic, such as reinforced fiberglass, construction.

While in the foregoing specification this invention has been described in relation to certain preferred embodiments thereof, and many details have been set forth for purpose of illustration, it will be apparent to those skilled in the art that the invention is susceptible to additional embodimens and that cerain of the details described herein can be varied considerably without departure from the basic principles of the invention.

I claim:

1. In an apparatus for extracting particulate matter and noxious gases from smoke and gas of the type providing a tortuous passage for said smoke and gas, the improvement comprising in combination: a bottom wall, a top wall, opposite side walls, a first end wall and an opposite end wall enclosing a chamber; a first partition extending between said side walls upwardly from said bottom wall, and a second partition extending between said side walls downwardly from said top wall having an opening between said second partition and said bottom wall and positioned between said first partition and said opposite end wall, said first partition extending upwardly from said bottom wall to a level higher than the level of downward extension of said second partition from said top wall; an inlet area comprised of said first end wall and said side walls between said first end wall and said first partition, said inlet area defining an inlet, said inlet being sufficiently high to permit retention of liquid between said first end wall and said first partition and said inlet being at a level below the level of uppermost extension of said first partition from said bottom wall; liquid contained between said first partition and said opposite end wall at a level above said opening of said second partition; an outlet area comprised of said opposite end wall, said top wall between said second partition and said opposite end wall, and said side walls between said second partition and said opposite end wall, an outlet defined by said outlet area, said outlet being at a level above the level of the lowermost extension of said second partition from said top wall; spraying means between said first end wall and said first partition directing spray downwardly; spraying means between said first partition and said second partition directing spray downwardly; means for removal of liquid from said chamber; and means for introducing liquid into said spraying means.

2. The apparatus of claim 1 wherein said first partition has openings therethrough below the level of fluid maintained between said first end and first partition of suitable size to maintain desired different fluid levels on each side of said first partition.

3. The apparatus of claim 1 wherein the top is arched for the entire inner length.

4. The apparatus of claim 1 wherein said inlet is in said first end.

5. The apparatus of claim 1 wherein said outlet is in said second end.

6. The apparatus of claim 1 wherein both said partitions and the lining of said chamber is refractory material.

7. The apparatus of claim 1 wherein said liquid is water.

References Cited
UNITED STATES PATENTS

| | | | |
|---|---|---|---|
| 116,604 | 7/1871 | Lewis | 55—259 |
| 889,694 | 6/1908 | Lambert | 55—244 |
| 914,279 | 3/1909 | Hurford | 55—257 |
| 1,010,068 | 11/1911 | Pavella | 261—115 |
| 1,066,837 | 7/1913 | Nordensson | 55—233 |
| 1,112,860 | 10/1914 | Smith | 261—118 |
| 1,235,535 | 7/1917 | Bowman | 55—256 |
| 2,089,178 | 8/1937 | Beveridge | 261—118 |
| 2,200,891 | 5/1940 | Nyborg | 55—233 |
| 2,650,080 | 8/1953 | Harker et al. | 261—118 |
| 3,095,463 | 6/1963 | Chang et al. | 261—121 |

FRANK W. LUTTER, Primary Examiner

B. NOZICK, Assistant Examiner

U.S. Cl. X.R.

55—244, 435, 466; 261—116, 117, 123